United States Patent [19]

Scholten et al.

[11] Patent Number: 4,473,539

[45] Date of Patent: Sep. 25, 1984

[54] PROCESS FOR PREPARING PURE SILICON DIOXIDE HAVING HIGH MECHANICAL STRENGTH AS WELL AS SILICON DIOXIDE OBTAINED BY APPLYING THIS PROCESS

[75] Inventors: Joseph J. F. Scholten, Sittard; Abraham Van Montfoort, Geleen, both of Netherlands

[73] Assignee: Stamicarbon B.V., Geleen, Netherlands

[21] Appl. No.: 493,401

[22] Filed: May 11, 1983

[30] Foreign Application Priority Data

May 11, 1982 [NL] Netherlands .................. 8201924

[51] Int. Cl.$^3$ .............................................. C01B 33/12
[52] U.S. Cl. ..................................... 423/339; 502/232
[58] Field of Search ..................... 423/335, 338, 339; 502/8, 232

[56] References Cited

U.S. PATENT DOCUMENTS

| | | | |
|---|---|---|---|
| 3,494,875 | 2/1970 | Le Page et al. | 423/338 |
| 3,794,713 | 2/1974 | Aboutboul et al. | 423/339 X |
| 3,935,299 | 1/1976 | Kiselev et al. | 423/338 |
| 4,026,997 | 5/1977 | Schneider et al. | 423/339 X |
| 4,256,682 | 3/1981 | Denton | 423/338 X |

FOREIGN PATENT DOCUMENTS 1121932 7/1968 United Kingdom ............... 423/339

*Primary Examiner*—Jack Cooper
*Attorney, Agent, or Firm*—Cushman, Darby & Cushman

[57] ABSTRACT

Process for preparing high mechanical strength pure silicon dioxide suitable for demanding high-grade technical applications including the combination of steps of (a) forming a reaction mixture containing a silicon dioxide precipitate by controllably and gradually admixing with firm agitation an at most 15 weight percent aqueous solution of hexafluorosilicic acid with an about 15 to about 35 weight percent ammonium hydroxide solution at about 25° C. to about 45° C. until the pH is about 8.5 to about 9.2 in the thus formed mixture containing a silicon dioxide precipitate; (b) separating the silicon dioxide precipitate from the mixture; (c) washing the thus separated precipitate; and (d) calcining the thus washed precipitate at about 900° C. to about 1500° C. Silicon dioxide produced in accordance with the present process has better physical properties than commercially available porous alpha-alumina.

15 Claims, 2 Drawing Figures

PROCESS FOR PREPARING PURE SILICON DIOXIDE HAVING HIGH MECHANICAL STRENGTH AS WELL AS SILICON DIOXIDE OBTAINED BY APPLYING THIS PROCESS

BACKGROUND AND OBJECTS OF THE PRESENT INVENTION

The invention broadly relates to a process for preparing high mechanical strength pure silicon dioxide from hexafluorosilicic acid and ammonia.

An already known process for preparing silicon dioxide starting from hexafluorosilicic acid and ammonia is described in the U.S. Pat. No. 3,271,107. In that process a 15-25% by weight hexafluorosilicic acid solution is reacted with an ammonium hydroxide solution, having a concentration of, for instance, 29% by weight, in a first step in a reaction zone with firm stirring at a pH of 6.0-8.0 to produce a suspension or slurry containing numerous extremely small silica nuclei. The quantities of the two reactants must be controlled to insure that the slurry has a pH of 6.0 to 8.0. The suspension or slurry formed in this reaction contains silicon dioxide and is subsequently reacted with ammonium hydroxide in a second step with less vigorous stirring for 20-120 minutes, at a pH of 8.3-9.0 to form a precipitate. The precipitated silicon dioxide is then separated off. The thus obtained silicon dioxide is a flocculate that in practice may only be used in low-grade technical applications, such as, for example, a filler in rubber products or as an additive for pigments. It has now been found impossible from a practical point of view to convert the thus obtained silicon dioxide into small lumps of sufficient mechanical strength and of reasonable dimensions which can be used for high-grade technical purposes, for instance as supporting material for catalysts.

U.S. Pat. No. 4,026,997 describes a process for preparing ammonium fluoride. In such process a silicon dioxide by-product is obtained by converting a 25-35% by weight solution of hexafluorosilicic acid with a 15-20% by weight ammonium hydroxide solution at 40° C. to 90° C. until a suspension is obtained containing more than 1% by weight free ammonia, less than 22% by weight ammonium fluoride, and precipitated silicon dioxide. The silicon dioxide by-product consists of coarser particles than in the above-disclosed U.S. patent, but the particles are extremely weak. Indeed, it has proved impossible to convert them to particles of sufficient mechanical strength.

A further frequently applied process for preparing silicon dioxide in the form of strong particles having reasonable particle size dimensions suitable for technical purposes consists of preparing silicon dioxide in the form of a gel (silica gel) by acidifying sodium silicate. The sodium salt is then washed out of the gelatinous precipitate obtained and a silica hydrogel is formed. This hydrogel can be converted by drying to form a xerogel. This xerogel is known in the trade as silica. In general this silica may be used, for instance, as supporting material for catalysts and as a drying agent, because it is obtained in the form of small strong lumps with reasonable dimensions.

Disadvantageously, however, the silica-gel process is very expensive. The complete washing of the sodium salt is a very expensive but necessary process if the silica is to have any real technical utility since sodium-containing silicon dioxide is known to sinter readily even at low temperature. Sintered silica loses its desirable surface qualities and characteristics.

Disadvantageously other preparative processes starting from hexafluorosilicic acid yield silicon dioxide in the form of a flocculate. The flocculate cannot be converted into a gel (see, for instance: 'The Chemistry of Silica' by Iler, R. K., page 563, John Wiley & Sons Inc., New York, 1979. The flocculate obtained in the processes applied so far for the preparation of silicon dioxide from hexafluorosilicic acid and ammonia consists of small, very weak particles, which cannot be converted into particles having sufficient strength and reasonable dimensions.

The present invention now provides a process using a hexafluorosilicic acid solution starting material to produce silicon dioxide having a low sodium content in the form of small lumps of reasonable dimensions and great mechanical strength. This silicon dioxide produced in accordance with the present process has a low sodium content and combines a high attrition resistance and mechanical strength with a relatively large surface area and pore volume. This silicon dioxide product has superior qualities imparted to it by the present process which qualities exceed those associated with the generally used alpha-alumina catalyst supports. Moreover, it has now been found that the thus obtained hydrophobic product can be economically and easily converted into a hydrophilic product which has about the same desirable qualities and characteristics.

DESCRIPTION OF THE PRESENT INVENTION

Figure 1:
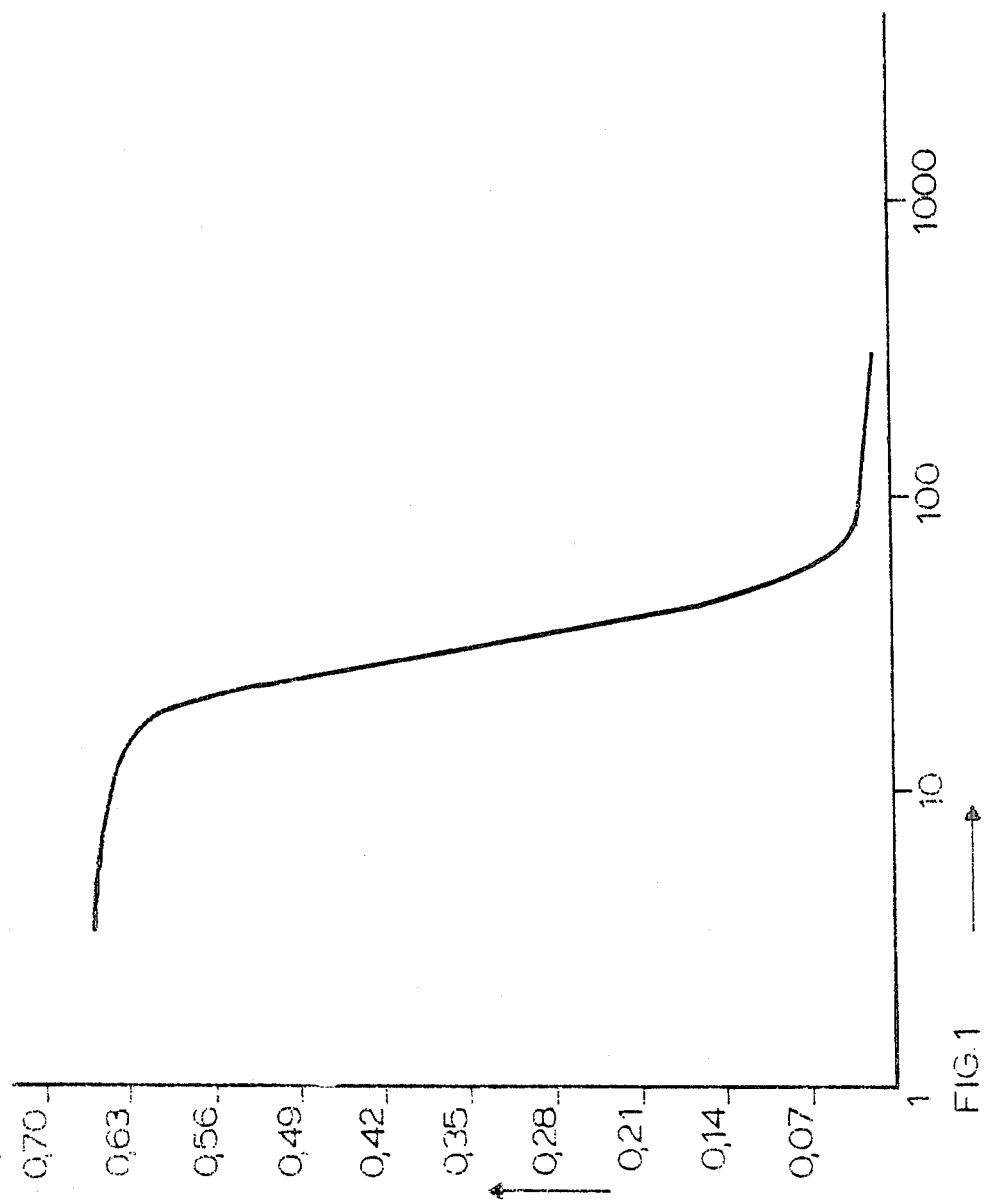
FIG. 1 illustrates the pore distribution of the silicon dioxide product, determined in a mercury porosimeter of the Carlo Erba type at a mercury pressure of between 1 and 3000 atm. In this figure the pore radius expressed in nm is plotted on the axis of the abscissae, while on the axis of ordination the cumulative pore volume expressed in $cm^2/g$ is plotted.
Figure 2:
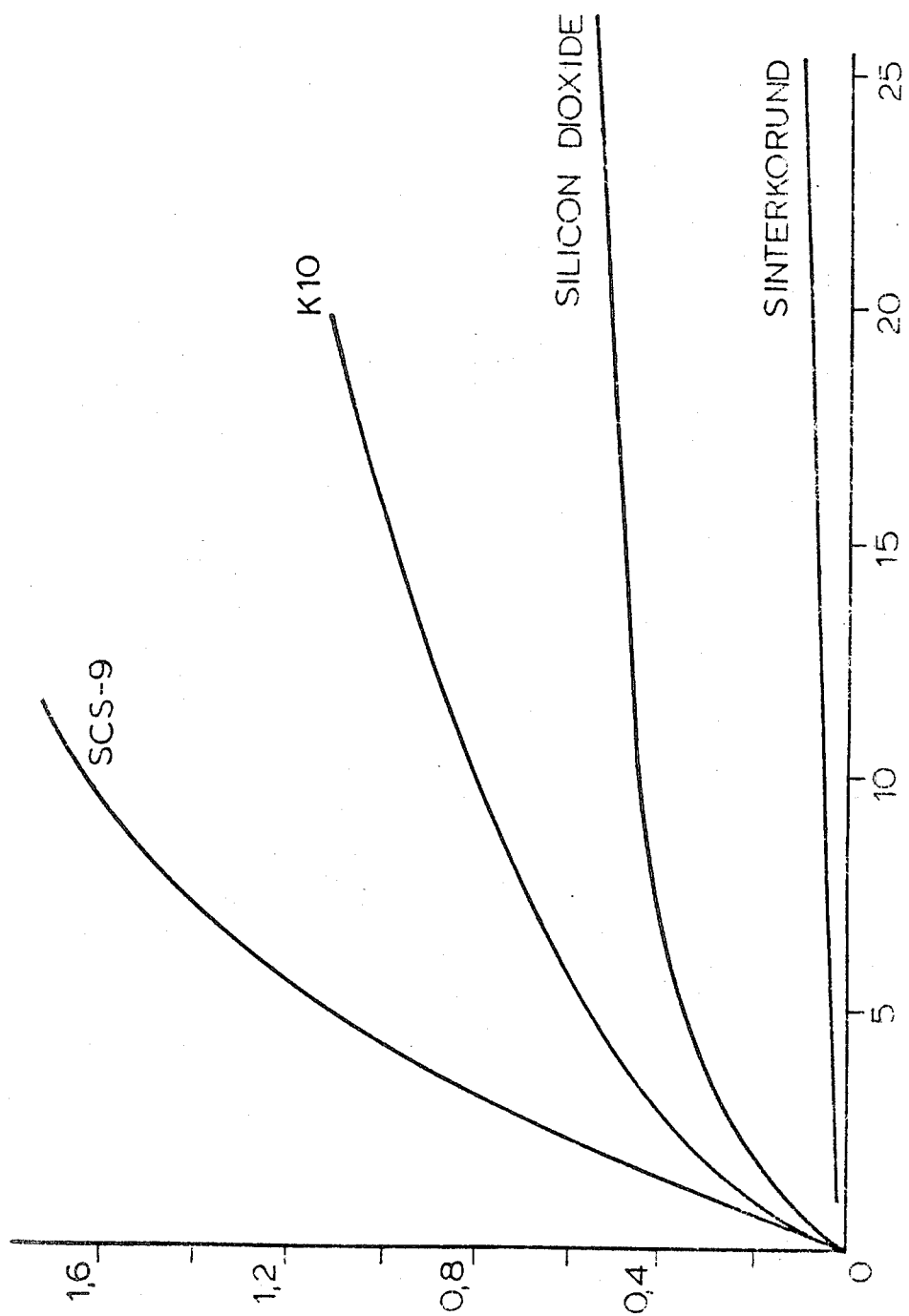
FIG. 2 illustrates the attrition resistance of the product obtained by the present process, compared with the attrition resistance of a few other, commercially available products. In this figure on the axis of ordination the loss in weight in % of the original weight is plotted against the fluidizing time applied to the products in hours (on the axis of the abscissae).

These and other objects of the present invention are achieved by very granually reacting an aqueous solution of hexafluorosilicic acid having a concentration of at most 15% by weight with an ammonium hydroxide solution having a concentration ranging from about 15 to 35% weight with firm stirring at a temperature of between about 25° C. and about 45° C. until a pH of between about 8.5 and about 9.2 has been reached in the reaction mixture to form in the reaction mixture a silicon dioxide precipitate, and subsequently separating, washing and then calcining the silicon dioxide precipitate by heating to about 900° C. to about 1500° C.

The silicon dioxide product produced by this process has a low sodium content (sodium content <100 ppm), consists of particles having an average diameter of between about 1 mm and about 10 mm, a specific surface (measured by the BET method) of between about 10 $m^2/g$ and about 100 $m^2/g$, a pore volume (measured by the mercury intrusion method) of between about 0.3 $cm^3/g$ and about 1.0 $cm^3/g$, and an attrition resistance, expressed in % loss in weight per unit of fluidizing time, of less than 0.5% after 10 hours fluidizing and less than 0.6% after 25 hours fluidizing. The pure silicon dioxide particles obtained are found to have a mechanical strength which at least equals that of alpha-alumina and greatly exceeds that of previously produced particles from hexafluorosilicic acid. In particular the specific surface is about 10 m$^2$/g to about 50 m$^2$/g and the pore volume is about 0.4 cm$^3$/g to about 0.8 cm$^3$/g, with greater than 80% of the pores having a radius of between about 10 nm and about 60 nm.

Advantageously and preferably the starting material is an about 6 to about 12% by weight, particularly about 10% by weight hexafluorosilicic acid solution. Yields of more than 98% are obtained when dilute hexafluorosilicic acid solutions are applied. Such an acid solution can be obtained by diluting and/or concentrating industrial hexafluorosilicic acid solutions, specifically solutions obtained by washing silicon-containing and fluorine-containing off-gases of a phosphate digestion and/or an evaporation section of a wet-process phosphoric acid manufacturing process. This has the additional advantage that hexafluorosilicic acid is a waste product obtained on a large scale in the preparation of wet-process phosphoric acid and superphosphates. Due to environmental problems, this waste product may not be discharged, or only discharged to a very restricted and limited degree, and is therefore available at a low price. Moreover, in preparing the said silicon dioxide an ammonium fluoride co-product is formed. The ammonium fluoride has a relatively large sales potential and, in addition, commands a fairly high market price.

In the present invention more highly concentrated solutions of hexafluorosilicic acid (for instance 30% by weight) can be employed. However with highly concentrated solutions the silicon dioxide yield will decline substantially, for instance from about 98% to about 30% to about 40%. Such lower yield will substantially raise the product cost. The cost increase is due in part to the additional processing required. For instance, the non-converted starting reactants and intermediate products, such as $(NH_4)_2SiF_6$, must then be separated off from the liquid remaining even after the silicon dioxide has been separated off.

The hexafluorosilicic acid solution is controllably and gradually admixed with ammonium hydroxide. Advantageously and preferably the basic solution is an about 20% to about 30% by weight ammonium hydroxide solution.

The temperature during the conversion is kept between about 25° and about 45° C. The reaction is highly exothermic and therefore the reaction mixture must generally be cooled during the conversion. When lower temperatures are applied, the conversion will be extremely slow, whereas, when higher temperature is applied, silicon dioxide is obtained not in the form of small lumps but in the form of a powder.

Like the temperature, the pH of the reaction mixture must also be kept within rather specific limits. Too high a pH has the disadvantage that silicon dioxide particles having a smaller strength will then be obtained, whereas too low a pH will be accompanied by a considerable decline in the yield. The pH should be between about 8.5 to about 9.2. The pH is preferably between about 8.9 and about 9.1.

The reaction mixture must be vigorously admixed, for instance, firmly stirred, during the conversion process. Preferably a stirring rate of about 150 to about 250 revolutions per minute is employed. More specifically about 200 rpm is advantageous. Too low a stirring rate will result in the formation of silicon dioxide powder, whereas high stirring rates, e.g. 600 revolutions per minute, not only require much more energy but also result in the formation of powder.

In order to obtain a good silicon dioxide product it is also important that the reactants should be contacted very gradually. Preferably this is achieved by injecting one of the two reactants below the liquid surface into the other reactant or by injecting both reactants into water, again below the liquid surface. In this latter regard, each solution is controllably injected below the surface of the reaction medium. Preferably in the present process ammonium hydroxide solution is injected below the surface of a hexafluorosilicic acid solution at such a rate that about 2 to about 5 parts by weight of ammonium hydroxide solution are metered per minute to about 100 parts by weight of hexafluorosilicic acid solution.

The reaction mixture which is thereby formed consists substantially of an ammonium fluoride solution with solid silicon dioxide. The silicon dioxide is then separated off, for instance by filtration, decantation or centrifugation. The separated-off silicon dioxide is thoroughly washed out. Exemplary washing liquids include water as well as a diluted solution of a mineral acid, for instance $HNO_3$. Advantageously washing the silicon dioxide product with an acid will even further reduce the calcium content and the fluorine content of the product. The washed product is subsequently dried and can be broken to form fairly strong lumps with suitable dimensions, e.g. 30 mm. Although not intending to be bound thereby, it is believed that the formation of strong lumps may perhaps be explained by the fact that by applying highly specific reaction conditions a silicon precipitate is obtained consisting of a flocculate with a little hydrogel functioning as an adhesive. The lumps obtained are subsequently calcined at a temperature between about 900° C. and about 1500° C. and preferably calcined at about 1000° C. to about 1300° C. The calcining process produces small lumps having very great mechanical strength. These small lumps are on the order of about 1 mm to about 10 mm and, if so desired can be converted by breaking or grinding into smaller particles ranging between, for example, about 1 to about 3 mm.

The thus obtained product is hydrophobic. The concentration of hydroxyl groups on the surface is about 0.60 to about 0.09 per nm$^2$. The product has a relatively large BET surface, has a large pore volume, and is strong and attrition resistant. The silicon dioxide product is so pure that it can be regarded chemically as virtually inert. Such a material is particularly suited as supporting material for catalysts. This chemically inert silicon dioxide is a particularly suitable support for catalysts that are prepared by the so-called impregnation method by the take-up of dissolved catalyst components in organophilic and organic solvents.

It is important for certain end uses for the silicon dioxide to be characterized as hydrophilic. For instance, a hydrophilic characterization is important if the silicon dioxide is to be used as a catalyst support wherein the catalyst components are applied in the form of aqueous solutions. It has now been found that the above-mentioned hydrophobic product produced by the present process can be hydroxylated in a simple manner to form a product with a concentration of hydroxyl groups on the surface of about 3.5 per nm$^2$ to about 6.0 per nm$^2$ without reduction of the BET surface, pore volume, strength or attrition resistance.

According to the present invention this is achieved by subjecting the calcined hydrophobic product to a static treatment using an excess of aqueous medium. Specifically the product can be treated for about 100 to about 200 hours with an excess of a dilute mineral acid at moderate to low temperature. For instance the treatment may comprise an about 100 hour to about 200 hour treatment with about 15 to about 25% by weight nitric acid solution at a temperature of between about 15° C. and about 35° C. The product may be treated for about 100 hours to about 200 hours with an excess of distilled water but in such treatment a temperature ranging between about 60° C. and about 90° C. should be employed.

In practicing the present process an aqueous reaction medium remains after the silicon dioxide precipitate is separated off. This aqueous medium consists substantially of an ammonium fluoride solution. This solution can be upgraded by concentration to technical ammonium fluoride or be converted into, for instance, alkali metal fluorides or hydrogen fluoride.

The invention will be further illustrated and explained by the following non-limiting examples.

EXAMPLE I

Half a liter of a 10% by weight H$_2$SiF$_6$ solution was fed into a 3 liter reaction vessel equipped with stirrer and cooler. This solution had been prepared by diluting a crude, about 30% by weight H$_2$SiF$_6$ solution (obtained by washing Si-containing and F-containing off-gases of a phosphoric acid plant) with water. The solution in the reaction vessel was stirred at a rate of 200 revolutions per minute, while the temperature was kept at 32° C. During stirring and while keeping the temperature at a constant level a 25% by weight ammonium hydroxide solution was injected just below the skin of the liquid surface at a metering rate of 16.25 cm$^3$ NH$_4$OH solution per minute. The metering was continued until the pH in the reaction mixture was about 9.0.

The reaction mixture was subsequently filtered, the resulting filter cake (2 gram/minute) was washed with distilled water and air-dried at 150° C. The dried cake could be broken up into lumps of 10 mm to 30 mm having a specific surface of 110 m$^2$/g, a pore volume of 0.54 cm$^3$/g and an OH-group concentration on the surface of 5/nm$^2$. The strength of these lumps was such that they could be crushed with the fingers.

Part of the filter cake was calcined in a quartz dish in an electric kiln for one hour at 1173° C. and subsequently cooled in dry air. Then the specific surface, pore volume and OH-group concentration of the thus obtained product were determined. The results are summarized in Table I. The product consisted of particles having a diameter of between about 1 mm and about 10 mm. The mechanical strength was so great that it proved impossible to bore a hole into a particle (diameter 8 mm).

EXAMPLE II

In the same way as in Example I part of the filter cake obtained after filtering and drying was calcined for 1 hour at 1155° C. The results are summarized in Table I.

EXAMPLE III

In the same way as in Example I the filter cake was calcined for 3 hours at 1173° C. The results are summarized in Table I.

EXAMPLE IV

Part of the calcined product obtained in Example I was subjected to a static treatment at room temperature for 120 hours with an excess of 20% (wt)-nitric acid solution, subsequently filtered, washed with water and dried at 150° C. The properties of the resulting product are also summarized in Table I.

EXAMPLE V

Part of the product obtained in Example II was subjected to the same treatment as described in Example IV. The results are summarized in Table I.

The pore distribution of the thus obtained product was also determined in a mercury porosimeter of the Carlo Erba type at a mercury pressure of between 1 atm and 3000 atm. A Carlo Erba type porosimeter is described in Powder Technology, Vol. 29, nr. 1, May/-June 1981, page 1-12 by Brakel, J. van. The maximum quantity of mercury forced in the product corresponds with a pore volume of 0.66 cm$^3$/g. The results found are represented in FIG. I. It shows that most of the pores have a radius of between 10 nm and 60 nm. Consequently, the product as far as it is here concerned has very wide, easily accessible pores.

EXAMPLE VI

Part of the product obtained in Example III was subjected to the same treatment as described in Example IV. The results are summarized in Table I.

EXAMPLE VII

Part of the calcined product obtained in Example I was subjected to a static treatment at 80° C. for 160 hours with an excess of distilled water, subsequently filtered, and dried at 150° C. The properties of the resulting product are also summarized in Table I.

EXAMPLE VIII

Part of the product obtained in Example III was subjected to the same treatment as described in Example VII. The results are summarized in Table I.

TABLE I

| Example no. | Spec. surface in m$^2$/g | Pore volume in cm$^3$/g | OH group concentration per nm$^2$ |
|---|---|---|---|
| I | 27 | 0.42 | 0.66 |
| II | 40 | 0.70 | 0.80 |
| III | 11 | 0.60 | 0.60 |
| IV | 19 | 0.50 | 4.10 |
| V | 43 | 0.66 | 3.80 |
| VI | 13.6 | 0.60 | 4.00 |
| VII | 27 | 0.44 | 4.50 |
| VIII | 11.5 | 0.60 | 3.70 |

EXAMPLE IX

The product of Example IV was analyzed via atomic spectrometry. The results are summarized in Table II.

TABLE II

| Iron | 24 ppm |
|---|---|
| Aluminium | <10 ppm |
| Potassium | 10 ppm |

TABLE II-continued

| | |
|---|---|
| Sodium | 96 ppm |
| Calcium | 12 ppm |
| Magnesium | 11 ppm |
| Lithium | 0.04 ppm |
| Fluorine | 10–100 ppm |
| Phosphorus | <10 ppm |

These results clearly show that in applying the present process a silicon dioxide is obtained which has such a degree of purity that it is chemically to be regarded as virtually inert. Such a chemically inert product is obtained even if the starting material is contaminated hexafluorosilicic acid. This is of great importance when silicon dioxide is employed as a catalyst support.

EXAMPLE X

Part of the calcined product of Example I was separated by screening into a fraction less than 1.4 mm, a fraction of 1.4–2 mm and a fraction greater than 2 mm. Subsequently the attrition resistance of the screened fraction of 1.4–2 mm was determined by passing this fraction into a fluid bed of glass beads at room temperature and at atmospheric pressure and periodically measuring the weight loss resulting from blowing out fines. In the fluid bed the silicon dioxide/glass bead weight ratio was selected at 1:5, the diameter of the glass beads was 0.45–0.55 mm; and the diameter of the bed was 7 cm.

For comparison purposes, the attrition resistance of a few other materials was determined in the same way:

(a) "Sinterkorund"=a perfectly non-porous substance, obtainable from Otto having a specific surface<0.1 $m^2/g$ and a particle diameter of about 3 mm, more than 99% of which consists of alpha-alumina.

(b) "K-10"=a catalyst support substantially consisting of alpha-alumina, obtainable from Otto, having a specific surface of 2 $m^2/g$ and a pore volume of 0.3–0.4 $cm^3/g$.

(c) "SCS-9"=a catalyst support substantially consisting of alpha-alumina, obtainable from Rhone-Poulene, having a specific surface of 7 $m^2/g$ and a pore volume of 0.35 $cm^3/g$.

The results measured are represented in FIG. II, where the loss in weight in % of the original weight is plotted against the fluidizing time in hours. FIG. II clearly shows that the calcined product obtained in applying the present process shows a substantially lower attrition than the known materials K-10 and SCS-9, while the specific surface is much higher than that of these catalyst supports frequently used in the art. Moreover, the mechanical strength of the calcined product was substantially greater than that of K-10 and SCS-9. The fact was that, unlike the K-10 and SCS-9 particles, it proved impossible to bore a hole into the particles of the first product.

EXAMPLE XI

In the same way as in Example I an $H_2SiF_6$ solution having a concentration of 7.5% by weight was treated at 32° C. with a 25% by weight $NH_4OH$ solution until the pH in the reaction mixture was about 9.0. The product obtained after filtering, washing and drying was sintered for 3 hours at 1000° C. The specific surface of the particles was 45 $m^2/g$, the pore volume was 1.72 $cm^3/g$ with an acute maximum in the pore distribution at 85 nm.

The sintering was repeated at 1100° C. The particles obtained had a strength comparable with that of gamma-alumina, a specific surface of 15 $m^2/g$, a pore volume of 0.79 $cm^3/g$, with an acute maximum in the pore distribution at 80 nm.

The sintering was repeated for 1 hour at 1150° C. The particles obtained had a strength comparable with α-alumina or corundum, a specific surface of 35 $m^2/g$, a pore volume of 0.61 $cm^3/g$, with an acute maximum at 33 nm.

The sintering was repeated at 1150° C. for 3 hours. A glass-like product was obtained which yet had a specific surface of 11 $m^2/g$, a pore volume of 0.16 $cm^3/g$ with a maximum at 27 nm.

EXAMPLE XII

The process of Example I was repeated on the understanding that the filter cake was washed with a 5% by weight $HNO_3$ solution. The product eventually obtained had a slightly higher specific surface than that of the product of Example I, while the calcium and fluorine content was substantially lower.

While the presently considered preferred embodiments have now been described, it should be recognized that such disclosure is not intended to restrict the scope of the following claims since the claim scope is intended to cover modified and equivalent processes.

What is claimed is:

1. Process for preparing a pure silicon dioxide product having high mechanical strength suitable for high-grade technical applications comprising the combination of steps of:

(a) forming a silicon dioxide precipitate in a reaction mixture by controllably and gradually admixing with firm agitation an aqueous solution of hexafluorosilicic acid, said solution having at most 15 weight percent of hexafluorosilicic acid, with an about 15 to about 35 weight percent ammonium hydroxide solution while maintaining the temperature at about 25° C. to about 45° C. until the pH is about 8.5 to about 9.2 in the thus formed mixture, said mixture being stirred at a stirring rate of about 150 to about 250 revolutions per minute, to thereby obtain a silicon dioxide precipitate in said mixture;

(b) separating said silicon dioxide percipitate from said mixture;

(c) washing said thus separated precipitate; and (d) calcining the thus washed precipitate at about 900° C. to about 1500° C. to thereby obtain silicon dioxide particles having a sodium content less than 100 parts per million, said particles having an average diameter of between about 1 mm and about 10 mm, a specific surface area of between 10 $m^2/g$, and 100 $m^2/g$, a pore volume of between 0.3 $cm^3/g$ and 1.0 $cm^3/g$ and an attrition resistance, expressed in percent loss in weight, of less than about 0.5% after ten hours of fluidization and less than about 0.6% after about 25 hours of fluidization.

2. Process according to claim 1, wherein an about 6% to about 12% by weight hexafluorosilicic acid solution is reacted at about 30° C. to about 35° C. with about 20% to about 30% by weight ammonium hydroxide solution until a pH of between about 8.9 and about 9.1 has been reached in said reaction mixture.

3. Process according to claim 2, wherein said calcining temperature is about 1000° C. to about 1300° C.

4. Process according to claim 1, wherein in step (a) one of the said solutions is injected below the liquid surface into the other solution.

5. Process according to claim 1, wherein step (a) further comprises forming said reaction mixture in a reaction medium by controllably injecting both said solutions below the liquid surface of said reaction medium.

6. Process according to claim 5, wherein the ammonium hydroxide solution is injected below the liquid surface into the hexafluorosilicic acid solution.

7. Process according to claim 6, wherein the ammonium hydroxide solution is metered in a quantity of about 2 to about 5 parts by weight per 100 parts by weight hexafluorosilicic acid solution per minute.

8. Process according to claim 1, wherein the separated-off silicon dioxide is washed with water or with a solution of a mineral acid.

9. Process according to claim 1, wherein the concentration of hydroxyl groups on the surface of said silicon dioxide particles is about 0.60 per $nm^2$ to about 0.90 $nm^2$.

10. Process according to claim 1, wherein the specific surface area of said particles is about 10 $m^2/g$ to about 50 $m^2/g$ and the pore volume of said particles is about 0.4 $cm^3/g$ to about 0.8 $cm^3/g$.

11. Process according to claim 1, wherein greater than 80% of the pores of said particles have a pore radius between 10 nm and 60 nm.

12. Process for preparing a pure silicon dioxide product having high mechanical strength suitable for high-grade technical applications comprising the combination of steps:
(a) forming a silicon dioxide precipitate in a reaction mixture by controllably and gradually admixing with firm agitation an aqueous solution of hexafluorosilicic acid, said solution having at most 15 weight percent of hexafluorosilicic acid, with an about 15 to about 35 weight percent ammonium hydroxide solution while maintaining the temperature at about 25° C. to about 45° C. until the pH is about 8.5 to about 9.2 in the thus formed mixture, said mixture being stirred at a stirring rate of about 150 to about 250 revolutions per minute, to thereby obtain a silicon dioxide precipitate in said mixture;
(b) separating said silicon dioxide percipitate from said mixture;
(c) washing said thus separated precipitate; and
(d) calcining the thus washed precipitate at about 900° C. to about 1500° C. to thereby obtain silicon dioxide particles having a sodium content less than 100 parts per million, said particles having an average diameter of between about 1 mm and about 10 mm, a specific surface area of between 10 $m^2/g$, and 100 $m^2/g$, a pore volume of between 0.3 $cm^3/g$ and 1.0 $cm^3/g$ and an attrition resistance, expressed in percent loss in weight, of less than about 0.5% after ten hours of fluidization and less than about 0.6% after about 25 hours of fluidization;
(e) treating said calcined precipitate of step (d) with an excess of an aqueous medium to prepare a hydrophilic silicon dioxide product.

13. Process according to claim 12, wherein said precipitate of step (d) is treated for about 100 to about 200 hours with about 15 to about 25% by weight nitric acid solution at a temperature ranging between about 15° C. to about 35° C.

14. Process according to claim 12, wherein said precipitate of step (d) is treated for about 100 hours to about 200 hours with distilled water at a temperature of between 60° C. and 90° C.

15. Process according to claim 12, wherein the concentration of hydroxyl groups at the surface of said hydrophilic silicon dioxide is about 3.5 to about 6.0 $nm^2$.

* * * * *